United States Patent [19]
Jones et al.

[11] 4,347,040
[45] Aug. 31, 1982

[54] BLADE TO BLADE VIBRATION DAMPER

[75] Inventors: John C. Jones, Palm Beach Gardens; Perry P. Sifford, Jupiter; Joel F. Sutton, Juno Isles, all of Fla.

[73] Assignee: United Technologies Corporation, Hartford, Conn.

[21] Appl. No.: 193,514

[22] Filed: Oct. 2, 1980

[51] Int. Cl.³ .............................................. F01D 5/10
[52] U.S. Cl. .............................. 416/190; 416/193 A; 416/500
[58] Field of Search .................. 416/144, 145, 193 A, 416/190, 500

[56] References Cited

U.S. PATENT DOCUMENTS

| | | | |
|---|---|---|---|
| 2,942,843 | 6/1960 | Sampson | 416/190 |
| 2,999,668 | 9/1961 | Howald et al. | 416/145 X |
| 3,181,835 | 5/1965 | Davis | 416/145 |
| 3,723,023 | 3/1973 | Crick | 416/500 X |
| 3,748,060 | 7/1973 | Hugoson et al. | 416/193 A X |
| 3,881,844 | 5/1975 | Hennessey et al. | 416/145 |
| 3,888,601 | 6/1975 | Glassburn | 416/144 |
| 4,101,245 | 7/1978 | Hess et al. | 416/190 |
| 4,182,598 | 1/1980 | Nelson | 416/500 X |

FOREIGN PATENT DOCUMENTS

| | | | |
|---|---|---|---|
| 989556 | 9/1951 | France | 416/193 A |
| 1374917 | 8/1964 | France | 416/190 |
| 153004 | 1/1956 | Sweden | 416/190 |

*Primary Examiner*—Everette A. Powell, Jr.
*Attorney, Agent, or Firm*—Robert C. Walker

[57] ABSTRACT

Effective damping of blade vibratory energy is sought by the apparatus described herein. The concepts relate specifically to what is known as blade to blade damping as is distinguished from blade to ground damping.

The dampers employed have a "T" shaped cross section geometry and are designed to extend circumferentially on an engine rotor between the platform sections of each pair of rotor blades. The dampers are of extreme light weight such that the sliploa d forces required to generate sliding contact between the damper and the blade platforms is low.

8 Claims, 4 Drawing Figures

BLADE TO BLADE VIBRATION DAMPER

TECHNICAL FIELD

This invention relates to axial flow rotary machines and specifically to the damping of vibratory energy in the blades of such machines.

The concepts were developed in the gas turbine engine industry for use in the turbine section of gas turbine engines, but have wider applicability in other industrial applications as well.

BACKGROUND ART

In a typical rotor assembly of an axial flow turbine, a plurality of rotor blades extend outwardly from a disk, or drum shaped structure. The blades extend across an annular flowpath for working medium, and in turbine embodiments extract energy from the working medium gases flowing across the blades. Each of the blades is formed of an airfoil section extending into the flowpath, a root section interlockingly engaging the disk or drum, and a platform section defining the inner boundary of the working medium flowpath.

The sequence of rotor blades passing through local aerodynamic perturbations in the working medium flowpath initiate alternatingly increased and decreased loadings on the blades. This variation in loading characteristic induces blade deflection and imparts a stress on the blade material. If the frequency at which the loading characteristic varies is coincident with the natural frequency of the blade resonance occurs; the deflection amplitudes become reinforcing and vibratory damage likely results.

Vibratory phenomenon and the need to attend to such problems in rotary machines has long been recognized. U.S. Pat. Nos. 3,112,915 to Morris entitled "Rotor Assembly Air Baffle"; 2,266,770 to Harlow entitled "Turbomachine Rotor Assembly"; 3,610,778 to Schottikon entitled "Support For Rotor Blades In A Rotor"; 3,666,376 to Damlis entitled "Turbine Blade Damper"; 3,709,631 to Karstensen et al entitled "Turbine Blade Seal Arrangement"; 3,751,183 to Nichols et al entitled "Interblade Baffle And Damper"; 3,887,298 to Hess et al entitled "Apparatus For Sealing Turbine Blade Damper Cavities"; 4,182,598 to Nelson entitled "Turbine Blade Damper"; and British Pat. No. 1,259,750 entitled "Rotor For A Fluid Flow Machine" are representative of the substantial attempts to solve rotor blade vibration problems in the past.

Each of the structures described in the above patents is of the blade to blade type configuration in which the damper under centrifugal loads is urged outwardly against the platforms of two adjacent blades. Each of the dampers extends axially across the disk or drum in the cavity beneath the blade platforms.

As will become apparent in the specification which follows, the concepts of the present invention depart both structurally and functionally from those previously utilized in the industry.

DISCLOSURE OF INVENTION

According to the present invention a blade to blade vibration damper extending circumferentially on a rotor between adjacent blades is provided with a "T" shaped cross section geometry.

A principle feature of the present invention is the circumferential extension of the damper. The damper has a "T" shaped cross section geometry with the top bar of the "T" being oriented to press against the undersides of the platforms of two adjacent rotor blades in the operation mode. A coverplate assembly holds a plurality of the dampers in proximity to the undersides of the respective blade platforms. Sufficient clearance between the pin or rivet holding each damper in the coverplate assembly is provided to enable the damper to freely seat against the undersides of the platforms in response to centrifugal loads as the machine is operated. Good longitudinal stiffness and extremely low weight are important characteristics of the damper.

A principle advantage of the present invention is effective damping of rotor blade vibration. Vibratory stresses in the blades of an operating machine are reduced. Sliding contact of the top bar of the damper along the undersurfaces of the adjacent blade platforms is encouraged through a reduction in the required slip load forces for structures incorporating the disclosed concepts. The damper cross section geometry provides the longitudinal stiffness and low weight which are essential to the enablement of friction damping slippage between the damper and the blade platforms.

The foregoing, and other features and advantages of the present invention will become more apparent in the light of the following description and accompanying drawing.

BEST MODE FOR CARRYING OUT THE INVENTION

Figure 1:
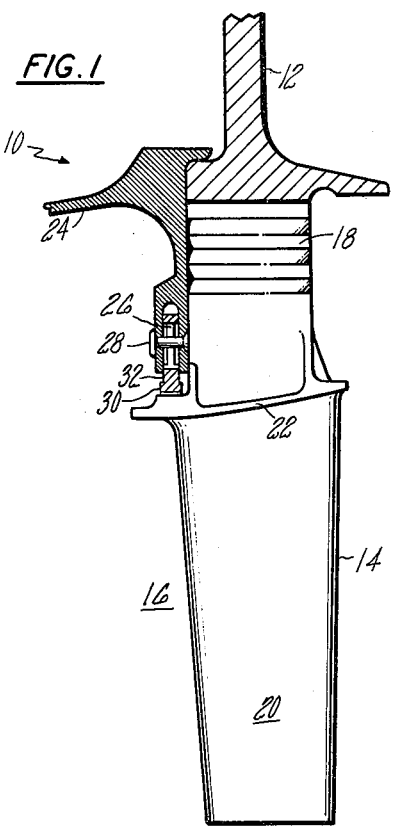
FIG. 1 is a simplified cross section view taken through a portion of the turbine section of a gas turbine engine.

The FIG. 1 rotor assembly 10 is of the type utilized in the turbine section of a gas turbine engine. The principal structural component is the rotor disk 12. A plurality of rotor blades, as represented by the single blade 14, interlockingly engage the rotor disk and extend radially outwardly therefrom into a flowpath 16. Each rotor blade has a root section 18 which engages the rotor disk and an airfoil section 20 which spans the flowpath. A platform section 22 forms the inner boundary of the working medium flowpath. A coverplate assembly 24 illustrated at the upstream end of the rotor disk in part holds the root sections of the rotor blades in engagement with the rotor disk and in part blocks the flow of working medium gases across the rotor assembly beneath the blade platforms. The coverplate assembly has affixed thereto a plurality of rotor blade dampers, as represented by the single damper 26. The damper has a "T" shaped cross section geometry and as illustrated is attached to the coverplate assembly by a rivet 28. The top bar 30 of the "T" shaped damper rests against the underside of the platform section 20. The web 32 of the damper is penetrated by the attaching rivet.

Figure 2:
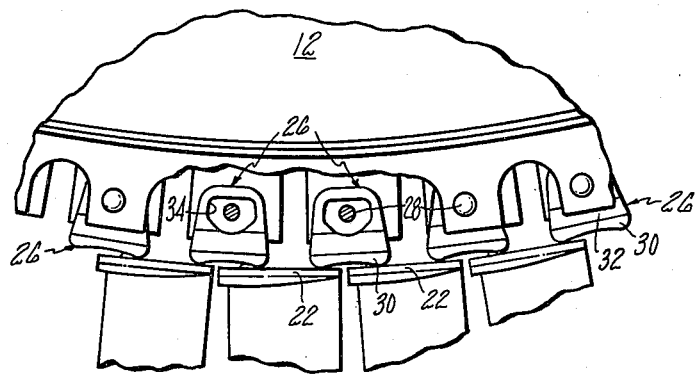
FIG. 2 is a simplified elevation view of a portion of the turbine section of FIG. 1 including portions thereof broken away to reveal the blade vibration dampers.

As is illustrated in FIG. 2 one damper 26 is disposed between each pair of adjacent rotor blades 14. The top bar 30 rests against the undersides of each of the two adjacent platform sections. Each of the attaching rivets 28 passes through a corresponding hole 34 in the web of the damper. A generous clearance is provided between each rivet and the connecting web hole so as to enable the damper to readily seat against the adjacent blade platform sections.

The damper 26 is of the generic "blade to blade" type. Vibratory deflection in each blade is transmitted across the damper to the adjacent blade. Vibratory energy is removed from the system at the interfaces A between the damper and the platform sections. Frictional forces generate heat at the interfaces A as the damper is caused to slide over the undersides of the platforms.

It is an essential feature of the present invention that sliding friction is enabled. To this end the damper is provided with a very high ratio of longitudinal stiffness to weight. Effective transmission of forces circumferentially around the disk from blade to blade along the longitudinal axis of the damper is accomplished. The "T" shaped cross section geometry is resistant to deflection under longitudinal loads resulting from the interblade transfer of vibratory energy and is resistant to transverse bending under centrifugal force loading in the operative environment at the interfaces A.

Figure 3:
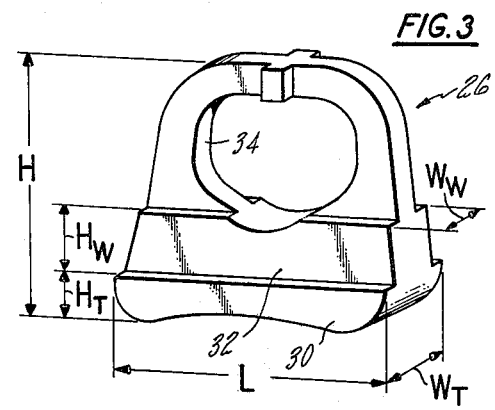
FIG. 3 is a perspective view of a blade vibration damper constructed in accordance with the concepts of the present invention.

Detailed aspects of such dampers are illustrated in the FIG. 3 perspective view. The damper is fabricated of nickel alloy material and has a weight of approximately four one hundredths of a pound (0.04 lbs.). In contrast to the blade dampers of the prior art, it is readily apparent that the present damper is of extremely small size. Material has been distributed, nevertheless, for maximum effect in providing longitudinal and transverse stiffness. The top bar 30 of the damper has a width $W_T$ of approximately one hundred twenty thousandths of an inch (0.120 in.) and a heighth $H_T$ of approximately sixty thousandths of an inch (0.060 in.). The principal structural portion of the web has a width $W_W$ of approximately eighty thousandths of an inch (0.080 in.) and a heighth $H_W$ of approximately one hundred thirty five thousandths of an inch (0.135 in.). The full height $H_F$ of the damper including the portion through which the hole passes is approximately one half inch (½ in.). The overall length L of the damper is also approximately one half inch (½ in.). In the damper illustrated spacing tabs 36 are provided to assist in stabilizing the damper within the coverplate assembly.

Figure 4:
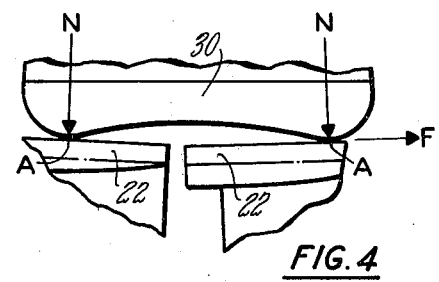
FIG. 4 is an illustration of damper force loading.

The fundamental principal of operation of the present damper can be visualized in the FIG. 4 illustration. The interfaces A between a damper 26 and the blade platform sections 20 is shown. In order to be effective the damper must be capable of sliding along the points of interface A such that vibratory energy can be dissipated in the form of friction generated heat. The force F required to cause movement between the damper and the platforms is termed "slipboard force" and is calculable in accordance with the formula below.

$$F = \mu N \phi$$

where
F = slipload force;
$\mu$ = coefficient of friction;
N = normal load; and
$\phi$ = slipload factor The normal load is a function damper weight and rotor speed of rotation and is the dominant factor in determining slipload force. The slipload factor $\phi$ is required to account for phase angle effects between leading or lagging blades.

As incredible as it may seem, the damper described by FIG. 3 and weighing only four one hundredths of a pound (0.04 lb.) generates a normal force at each point of interface A of eighty five pounds (85 lbs) in a typical high performance aircraft engine. The corresponding slipload force is eighteen pounds (18 lbs.). In other words, a vibrating blade must be capable of generating a force along the axis of the damper of eighteen pounds (18 lbs.) before frictional damping and dissipation of energy can occur.

The achieved low slipload force enabled by the present structure is a significant advance in the art and is sufficiently low to prevent the damper from locking up without sliding under centrifugal loads.

Although the invention has been shown and described with respect to preferred embodiments thereof, it should be understood by those skilled in the art that various changes and omissions in the form and detail thereof may be made therein without departing from the spirit and the scope of the invention.

We claim:

1. In a rotor assembly of the axial flow rotary machine type in which a plurality of individually mounted blades, each having a platform section, extend outwardly on the machine, the improvement comprising:

a blade to blade damper adapted to seat against a pair of adjacent blade platform sections in response to centrifugally generated loads in an operating engine and of essentially "T" shaped cross section geometry including a top bar and a web extending circumferentially with respect to the machine between said pair of adjacent blade platform sections wherein the top bar provides longitudinal stiffness in the direction of expected slip load forces and the web provides transverse stiffness in the direction normal to the expected slip load forces.

2. The invention according to claim 1 which further includes a coverplate assembly within which each of said blade to blade dampers is trapped.

3. The invention according to claims 1 or 2 in which said blade to blade dampers are of sufficiently light weight to limit the magnitude of the slipload force required to cause relative movement between said damper and said platform sections in an operative environment to a value below that which is generated by blade vibration such that energy in the vibrating blade is capable of being dissipated in the form of heat energy at the points of contact between the damper and platform sections.

4. The invention according to claim 3 wherein the weight of said dampers is approximately four one hundredths of a pound (0.04 lb.).

5. A blade to blade vibration damper of the type suited for use circumferentially between the platforms of adjacent rotor blades in a gas turbine engine wherein said damper extends longitudinally between the platforms of adjacent rotor blades and has a "T" shaped cross section geometry for providing good longitudinal stiffness and resistance to transverse bending in response to vibration loads and centrifugal loads respectively.

6. The invention according to claim 5 wherein said damper is of extreme light weight, on the order of four one hundredths of a pound (0.04 lb.).

7. The invention according to claim 6 wherein said damper has a length L of approximately one half inch (½ in.) and wherein said damper has a top bar portion having a width $W_T$ of approximately one hundred twenty thousandths of an inch (0.120 in.) and a heighth $H_T$ of approximately sixty thousandths of an inch (0.060 in.).

8. The invention according to claim 7 wherein said damper has a web portion having a width $W_W$ of approximately eighty thousandths of an inch (0.080 in.) and a heighth $H_W$ of approximately one hundred thirty five thousandths of an inch (0.135 in.).

* * * * *